(12) United States Patent
Ishii et al.

(10) Patent No.: US 7,957,755 B2
(45) Date of Patent: Jun. 7, 2011

(54) MOBILE STATION, RADIO ACCESS NETWORK APPARATUS, MOBILE COMMUNICATION SYSTEM AND BROADCAST INFORMATION TRANSMITTING AND RECEIVING METHOD

(75) Inventors: Minami Ishii, Yokohama (JP); Sadayuki Abeta, Yokohama (JP); Takehiro Nakamura, Yokohama (JP)

(73) Assignee: NTT Docomo, Inc., Tokyo (JP)

( * ) Notice: Subject to any disclaimer, the term of this patent is extended or adjusted under 35 U.S.C. 154(b) by 612 days.

(21) Appl. No.: 12/091,263

(22) PCT Filed: Oct. 23, 2006

(86) PCT No.: PCT/JP2006/321049
§ 371 (c)(1),
(2), (4) Date: Apr. 23, 2008

(87) PCT Pub. No.: WO2007/049551
PCT Pub. Date: May 3, 2007

(65) Prior Publication Data
US 2009/0117853 A1 May 7, 2009

(30) Foreign Application Priority Data
Oct. 24, 2005 (JP) .................................. 2005-308925

(51) Int. Cl.
*H04Q 7/20* (2006.01)

(52) U.S. Cl. ...... 455/511; 455/3.01; 455/3.04; 455/450; 455/500; 455/509; 370/328; 370/329; 370/343; 370/331

(58) Field of Classification Search .................. 455/511, 455/508, 507, 500, 517, 450, 452.1, 452.2, 455/403, 550.1, 436.1–444, 426.1, 426.2, 455/435.1, 435.2, 3.01, 3.04, 509; 370/328, 329, 343, 310, 331–337
See application file for complete search history.

(56) References Cited

U.S. PATENT DOCUMENTS
7,546,132 B2 * 6/2009 Lee et al. ...................... 455/503

FOREIGN PATENT DOCUMENTS
| JP | 3533155 | 3/2004 |
|---|---|---|
| JP | 2005-117577 | 4/2005 |
| JP | 2005-278006 | 10/2005 |
| TW | 490955 B | 6/2002 |

OTHER PUBLICATIONS
Taiwanese Office Action for Application No. 095139192, mailed on Jul. 30, 2010 (8 pages).

(Continued)

*Primary Examiner* — Keith T Ferguson
(74) *Attorney, Agent, or Firm* — Osha • Liang LLP (57) ABSTRACT

A mobile station for establishing a signaling control channel and a shared data channel between a radio access network apparatus and the mobile station to perform communication includes discontinuous reception means configured to perform discontinuous reception of broadcast information using the signaling control channel, shared data channel reception determination means configured to determine whether to receive the shared data channel based on an item of broadcast information and information indicating presence or absence of change of content corresponding to the item of the broadcast information that are transmitted by the signaling control channel, and shared data channel reception means configured to receive the shared data channel according to the determination.

11 Claims, 5 Drawing Sheets

OTHER PUBLICATIONS esp@cenet Patent Abstract for Taiwanese Publication No. 490955, publication date Jun. 11, 2002. (1 page).
International Search Report (English & Japanese) for PCT/JP2006/321049 mailed Nov. 14, 2006 (7 pages).
Written Opinion of International Searching Authority (Japanese only) mailed Nov. 14, 2006 (3 pages).
3GPP TS 25.331 V6.7/0 Sep. 2005 "Radio Resource Control (RRC) Protocol Specification".

* cited by examiner

| BROADCAST INFORMATION ITEM | BROADCAST INFORMATION RECEPTION CELL ID | BROADCAST INFORMATION RECEPTION TIME | Value tag | BROADCAST INFORMATION CONTENT |
|---|---|---|---|---|
| UPLINK INTERFERENCE AMOUNT | 1 | 00:00:00.000 | 2 | 90dBm |
| RESTRICTION RELATED INFORMATION | 1 | 00:00:00.020 | 5 | UNDER RESTRICTION, TRANSMISSION ESTABLISHED=1/2 |
| CHANNEL SETTING INFORMATION | 1 | ... | ... | ... |
| ... | | | ... | ... |

MOBILE STATION, RADIO ACCESS NETWORK APPARATUS, MOBILE COMMUNICATION SYSTEM AND BROADCAST INFORMATION TRANSMITTING AND RECEIVING METHOD

TECHNICAL FIELD

The present invention relates to a mobile station, a radio access network apparatus, a mobile communication system and a broadcast information transmitting and receiving method.

BACKGROUND ART

In mobile communication systems, a mobile station is notified of information necessary when performing connection setup or necessary during connection, and notified of information on other systems beforehand. This information is called broadcast information (system information).

Broadcast information in IMT 2000 includes a master information block (MIB) and subordinating system information blocks (SIBs).

The master information block includes presence or absence of transmission of the system information block, transmission schedule, and a value (value tag) indicating presence or absence of change of information content. On the other hand, the system information blocks are defined for each type of information having a same property. For example, as the system information blocks, setting information of a common channel and information on restriction are defined as different system information blocks.

In IMT 2000, it is defined that a mobile station originates a call after reading necessary broadcast information before performing call connection. However, transmission schedule of the system information block or the value tag cannot be ascertained unless the master information block is read. Thus, it is at least necessary to read the master information block. For example, since an interleave length of the broadcast information channel in IMT 2000 is 20 ms, the mobile station needs to receive broadcast information at least for 20 ms to read the master information block.

DISCLOSURE OF THE INVENTION

Problem to be Solved by the Invention

However, there is a following problem in the above-mentioned background art.

When there is no change of information as a result of re-reading the master information block, the mobile station did not have to re-read the broadcast information. But, even in such a case, since the mobile station receives the master information block, there is a problem that battery is unnecessarily consumed. That is, even though there is no change of information, it is necessary to perform receiving processes while reading the master information block, so that the battery is unnecessarily consumed.

In addition, irrespective of necessity of re-reading the broadcast information, since time for reading the master information block is necessary, there is a problem in that time required for establishing connection increases.

The present invention is contrived in view of the above-mentioned problem, and an object is to provide a mobile station, a radio access network apparatus, a mobile communication system and a broadcast information transmitting and receiving method that can decrease battery consumption and can decrease connection time.

Means for Solving the Problem

The problem can be solved by a mobile station for establishing a signaling control channel and a shared data channel between a radio access network apparatus and the mobile station to perform communication, including:

discontinuous reception means configured to perform discontinuous reception of broadcast information using the signaling control channel;

shared data channel reception determination means configured to determine whether to receive the shared data channel based on an item of broadcast information and information indicating presence or absence of change of content corresponding to the item of the broadcast information that are transmitted by the signaling control channel; and shared data channel reception means configured to receive the shared data channel according to the determination.

By configuring like this, since the necessity for receiving currently reported broadcast information can be determined by receiving the signaling control channel, it is only necessary to perform reception only for reception time of the signaling control channel that is only 0.07 ms, for example, when there is no change of content of the broadcast information, so that battery consumption can be decreased. In addition, time required for completing call connection can be decreased.

In addition, like other traffic channels, a configuration can be adopted in which the shared data channel is received after the signaling control channel is received, so that configuration of a reception part of the mobile station can be made to be the same.

In addition, the present invention can be also configured as a radio access network apparatus for establishing a shared data channel and a signaling control channel between the radio access network apparatus and a mobile station to perform communication, including:

signaling control channel control means configured to transmit, at a broadcast information transmission timing using the signaling control channel, an item of broadcast information to be transmitted by the shared data channel corresponding to the signaling control channel and information indicating presence or absence of change of content corresponding to the item of the broadcast information; and shared data channel control means configured to transmit, at a broadcast information transmission timing, the broadcast information corresponding to the transmitted item of the broadcast information using the shared data channel corresponding to the signaling control channel.

By configuring like this, time required for completing call connection can be decreased. In addition, like other traffic channels, a configuration can be adopted in which the shared data channel is transmitted after the signaling control channel is transmitted, so that configuration of a transmission part of the radio access network apparatus can be made to be the same.

In addition, the present invention can be also configured as a mobile communication system for establishing a shared data channel and a signaling control channel between a mobile station and a radio access network apparatus to perform communication, the mobile station including:

discontinuous reception means configured to perform discontinuous reception of broadcast information using the signaling control channel;

shared data channel reception determination means configured to determine whether to receive the shared data channel based on an item of broadcast information and information indicating presence or absence of change of content corresponding to the item of the broadcast information that are transmitted by the signaling control channel; and shared data channel reception means configured to receive the shared data channel according to the determination, the radio access control apparatus including:

signaling control channel control means configured to transmit, at a broadcast information transmission timing using the signaling control channel, an item of broadcast information to be transmitted by the shared data channel corresponding to the signaling control channel and information indicating presence or absence of change of content corresponding to the item of the broadcast information; and shared data channel control means configured to transmit, at a broadcast information transmission timing, the broadcast information corresponding to the transmitted item of the broadcast information using the shared data channel corresponding to the signaling control channel.

By configuring like this, since the mobile station can determine the necessity for receiving currently reported broadcast information by receiving the signaling control channel, it is only necessary to perform reception only for reception time of the signaling control channel that is only 0.07 ms, for example, when there is no change of content of the broadcast information, so that battery consumption can be decreased. In addition, the mobile station can decrease time required for completing call connection. In addition, like other traffic channels, a configuration can be adopted in which the shared data channel is received after the signaling control channel is received, so that configuration of a reception part of the mobile station can be made to be the same. On the other hand, the radio access network apparatus can decrease time required for completing call connection. In addition, as to the radio access network apparatus, like other traffic channels, a configuration can be adopted in which the shared data channel is transmitted after the signaling control channel is transmitted, so that configuration of a transmission part of the radio access network apparatus can be made to be the same.

In addition, the present invention can be also configured as a broadcast information transmitting and receiving method in a mobile communication system for establishing a shared data channel and a signaling control channel between a mobile station and a radio access network apparatus to perform communication, the broadcast information transmitting and receiving method including:

a discontinuous reception step in which the mobile station performs discontinuous reception of broadcast information using the signaling control channel;

a signaling control channel transmission step in which the radio access network apparatus reports, using the signaling control channel, an item of broadcast information to be transmitted by the shared data channel corresponding to the signaling control channel and information indicating presence or absence of change of content corresponding to the item of the broadcast information at the broadcast information transmission timing;

a shared data channel reception determination step in which the mobile station determines whether to receive the shared data channel based on the item of the broadcast information and the information indicating presence or absence of change of content corresponding to the item of the broadcast information that are transmitted by the signaling control channel;

a shared data channel transmission step in which the radio access network apparatus transmits broadcast information corresponding to the reported item of the broadcast information at a broadcast information transmission timing using the shared data channel corresponding to the signaling control channel; and a shared data channel reception step in which the mobile station receives the shared data channel according to the determination.

By configuring like this, since the mobile station can determine the necessity for receiving currently reported broadcast information by receiving the signaling control channel, it is only necessary to perform reception only for reception time of the signaling control channel that is only 0.07 ms, for example, when there is no change of content of the broadcast information, so that battery consumption can be decreased. In addition, the mobile station can decrease time required for completing call connection. In addition, like other traffic channels, a configuration can be adopted in which the shared data channel is received after the signaling control channel is received, so that configuration of a reception part of the mobile station can be made to be the same. On the other hand, the radio access network apparatus can decrease time required for completing call connection. In addition, as to the radio access network apparatus, like other traffic channels, a configuration can be adopted in which the shared data channel is transmitted after the signaling control channel is transmitted, so that configuration of a transmission part of the radio access network apparatus can be made to be the same.

Effect of the Invention

According to an embodiment of the present invention, a technique for decreasing connection time and decreasing battery consumption of the mobile station can be realized.

DESCRIPTION OF REFERENCE SIGNS

100 mobile station
200 radio access network apparatus

PREFERRED EMBODIMENTS FOR CARRYING OUT THE INVENTION

Next, preferred embodiments for carrying out the present invention are described with reference to figures based on the following embodiments. By the way, in all figures for describing the embodiments, same symbols are used for parts having same functions.

Figure 1:
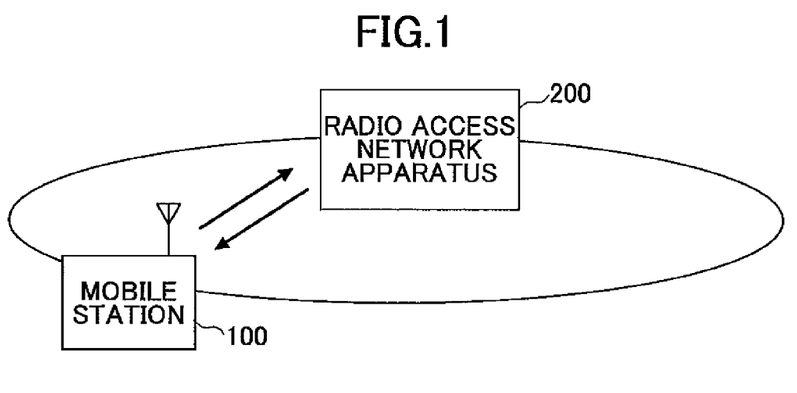
FIG. 1 is a schematic diagram showing a mobile communication system according to an embodiment of the present invention.

A mobile communication system according to an embodiment of the present invention is described with reference to FIG. 1.

The mobile communication system includes a mobile station 100 and a radio access network apparatus 200.

The mobile station 100 and the radio access network apparatus 200 sets up a signaling control channel and a shared data channel to perform communications via these channels.

Figure 2:
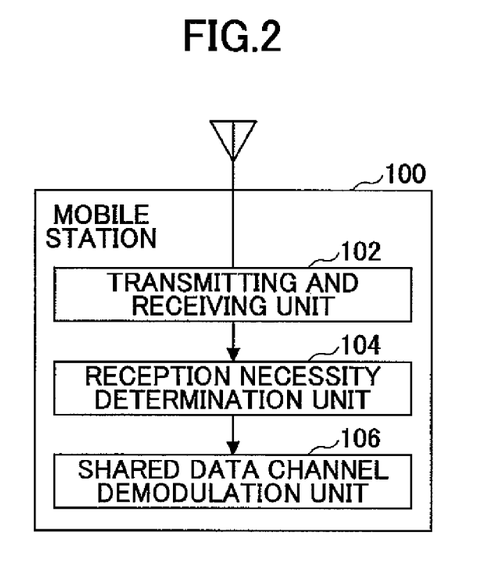
FIG. 2 is a block diagram of a mobile station according to an embodiment of the present invention.

Next, a configuration of the mobile station 100 of the present embodiment is described with reference to FIG. 2.

The mobile station 100 includes a data transmitting and receiving unit 102 as a discontinuous reception unit having an antenna, a reception necessity determination unit 104 as a shared data channel reception determination unit connected to the transmitting and receiving unit 102, and a shared data channel demodulation unit 106 as a shared data channel reception unit connected to the reception necessity determination unit 104.

The transmitting and receiving unit 102 performs data transmission and reception. For example, the transmitting and receiving unit 102 performs discontinuous reception of the signaling control channel.

The reception necessity determination unit 104 determines whether to receive the shared data channel based on an item, of broadcast information to be transmitted by the shared data channel, transmitted by the signaling control channel and based on information indicating presence or absence of change of content corresponding to the item of broadcast information.

For example, the reception necessity determination unit 104 may determine the item of the broadcast information to be transmitted by the shared data channel based on a number of a system information block, and may determine the information indicating presence or absence of change of content corresponding to the item of broadcast information based on the value of Value tag.

In this case, each item of the broadcast information to be transmitted by the shared data channel is associated with each number of system information blocks. The radio access network apparatus 200 transmits the number of the system information block associated with each item of the broadcast information to be transmitted by the shared data channel.

The Value tag is included in MIB among MIB and SIB forming the broadcast information, and indicates a state of update of SIB. For example, the Value tag takes a value of "1"-"8", and the value is updated each time when SIB is updated.

For example, SIB is formed by a plurality of blocks, that is, by 18 blocks, for example, and each block stores different information. In addition, a group is formed by a predetermined number of blocks, and one MIB is placed for one group. For example, 20 blocks in which two "Reserve" blocks are added to 18 SIB blocks are divided into 5 groups in which one MIB is located at the top of each group.

The reception necessity determination unit 104 determines presence or absence of change of content corresponding to the item of the broadcast information based on the Value tag stored in MIB placed at the top of the group formed by the predetermined number of blocks. The Value tag stored in MIB placed at the top of the group indicates whether content stored in the group is changed. In addition, when the reception necessity determination unit 104 determines that the content corresponding to the item of the broadcast information is changed, the reception necessity determination unit 104 determines to receive the content corresponding to the item of broadcast information stored in the blocks forming the group. That is, it determines to receive the shared data channel.

When it is determined to receive the shared data channel by the reception necessity determination unit 104, the shared data channel demodulation unit 106 demodulates the shared data channel that is received at a timing corresponding to the signaling control channel. The shared data channel includes content corresponding to the item of broadcast information transmitted by the signaling control channel.

In addition, the shared data channel demodulation unit 106 stores a result of demodulation of the shared data channel into a memory and the like. When the value is effective when performing a next call connection, that is, when it is determined that there is no change of content corresponding to the item of broadcast information based on the signaling control channel, a value stored in the memory may be used. For example, the mobile station 100 may be provided with a broadcast information management table shown in FIG. 3, so that the shared data channel demodulation unit 106 may holds, in the broadcast information management table, demodulation content of the shared data channel transmitted from the radio access network apparatus 200 to manage the broadcast information content.

Figure 3:
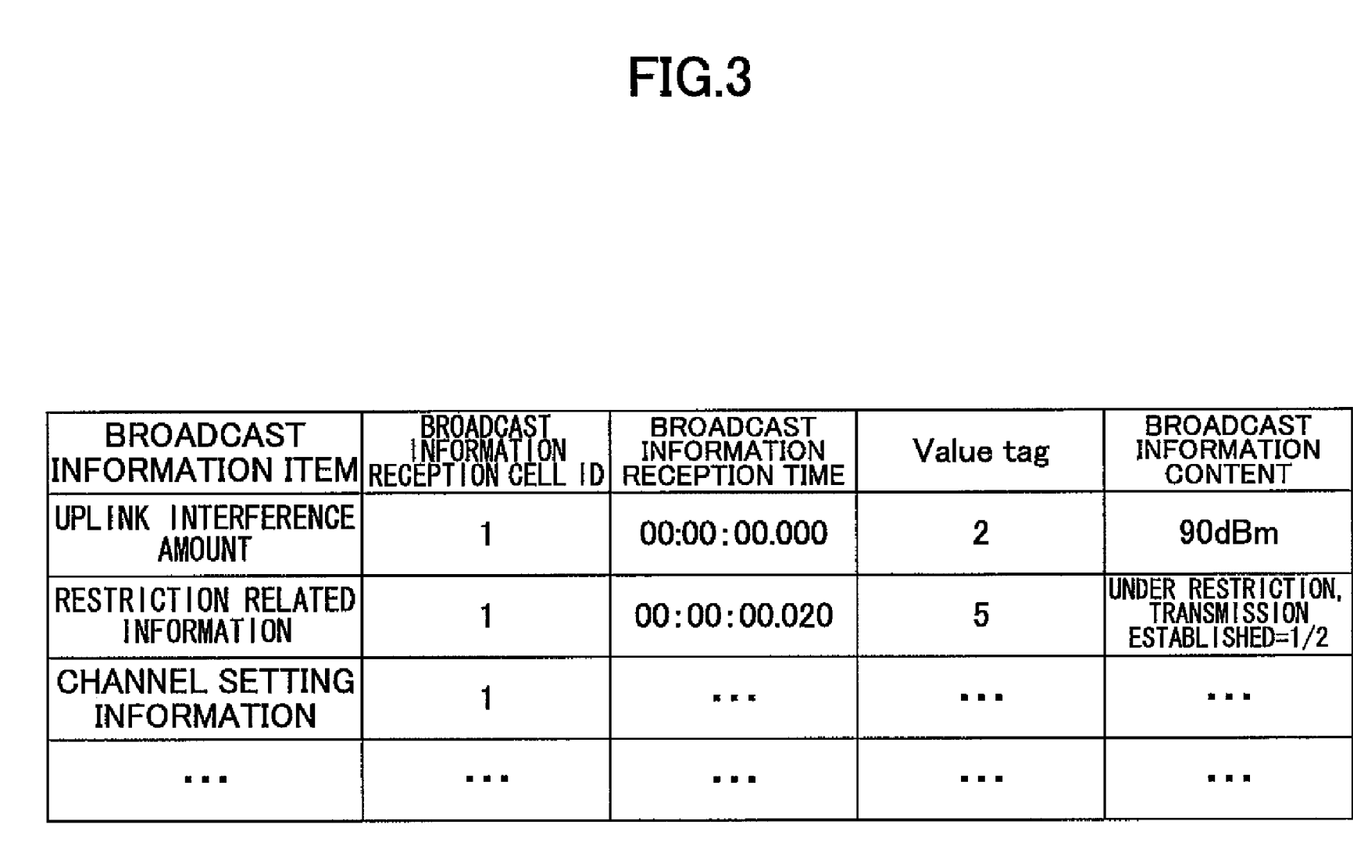
FIG. 3 is a schematic diagram showing a broadcast information management table in a mobile station according to an embodiment of the present invention.

For example, the broadcast information management table stores items of broadcast information, broadcast information reception cell ID, broadcast information reception timer, Value tag and content of broadcast information which are associated with each other.

Figure 4:
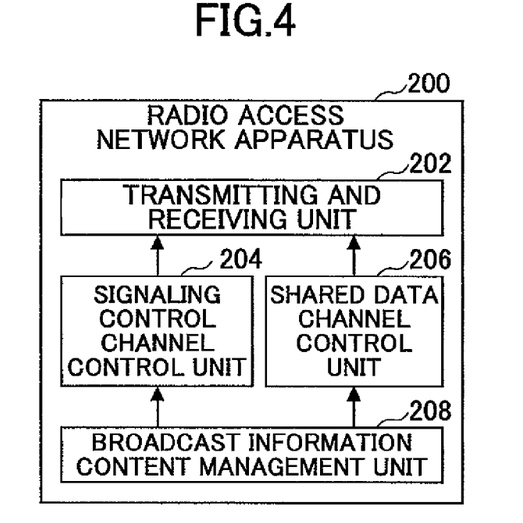
FIG. 4 is a block diagram showing a radio access network apparatus according to an embodiment of the present invention.

Next, the radio access network apparatus 200 of the present embodiment is described with reference to FIG. 4.

The radio access network apparatus 200 includes a transmission unit 202, a signaling control channel control unit 204 and a shared data channel control unit 206 that are connected to the transmission unit 202, and a broadcast information content management unit 208 connected to the signaling control channel control unit 204 and the shared data channel control unit 206.

The transmission unit 202 transmits the signaling control channel at a broadcast information transmission timing. In addition, the transmission unit 202 transmits a shared data channel corresponding to the signaling control channel at the broadcast information transmission timing.

The signaling control channel control unit 204 assigns a transmission schedule to the transmission timing of the broadcast information to report a name of item of broadcast information to be transmitted by a corresponding shared data channel.

In addition, the signaling control channel control unit 204 assigns a transmission schedule to the broadcast information transmission timing to report information indicating presence or absence of change of content corresponding to the item of broadcast information to be transmitted by the corresponding shared data channel. For example, the signaling control channel control unit 204 reports, as item name of broadcast information, information indicating at least one of channel setting information, network setting information, restriction related information, mobile station timer related information, uplink interference amount information, service related information, other system related information, time information, surrounding cell related information, handover related information, measurement related information, default setting information, and transmission power related information.

In addition, the signaling control channel control unit 204 may associates each item of broadcast information with each number of system information block to report the number of the system information block.

In addition, for example, the signaling control channel control unit 204 may report the value of Value tag as information indicating presence or absence of change of content corresponding to the item of broadcast information.

The shared data channel control unit 206 assigns a transmission schedule to the broadcast information transmission timing so as to transmit broadcast information corresponding to the reported item of broadcast information using a shared data channel corresponding to the signaling control channel. For example, the shared data channel control unit 206 reports content corresponding to the item of broadcast information.

The broadcast information content management unit 208 manages content corresponding to each item of broadcast information, information indicating presence or absence of change of content of broadcast information, transmission cycle, transmission timing and the like. For example, the broadcast information content management unit 208 may manage the broadcast information items for each system information block, and may use a value of Value tag as information indicating presence or absence of change of content of broadcast information.

Figure 5:
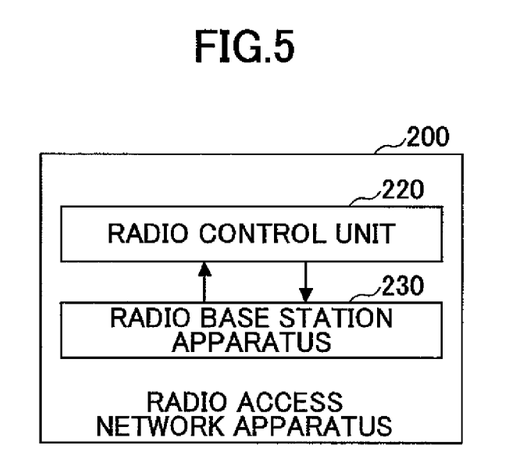
FIG. 5 is a block diagram showing a radio access network apparatus according to an embodiment of the present invention.

In the present embodiment, as shown in FIG. 5, a case is described in which the radio access network apparatus 200 includes a function of a radio control apparatus and a function of a radio base station apparatus. In this case, for example, the radio control apparatus 220 is provided with the broadcast information content management unit 208, and the radio base station apparatus 230 is provided with the signaling control channel control unit 204, the shared data channel control unit 206 and the transmission unit 202.

The radio access network apparatus 200 may be realized as the radio control apparatus 220 and the radio base station apparatus 230.

Next, operation of the mobile communication system as a broadcast information transmitting and receiving method of the present embodiment is described.

Figure 6:
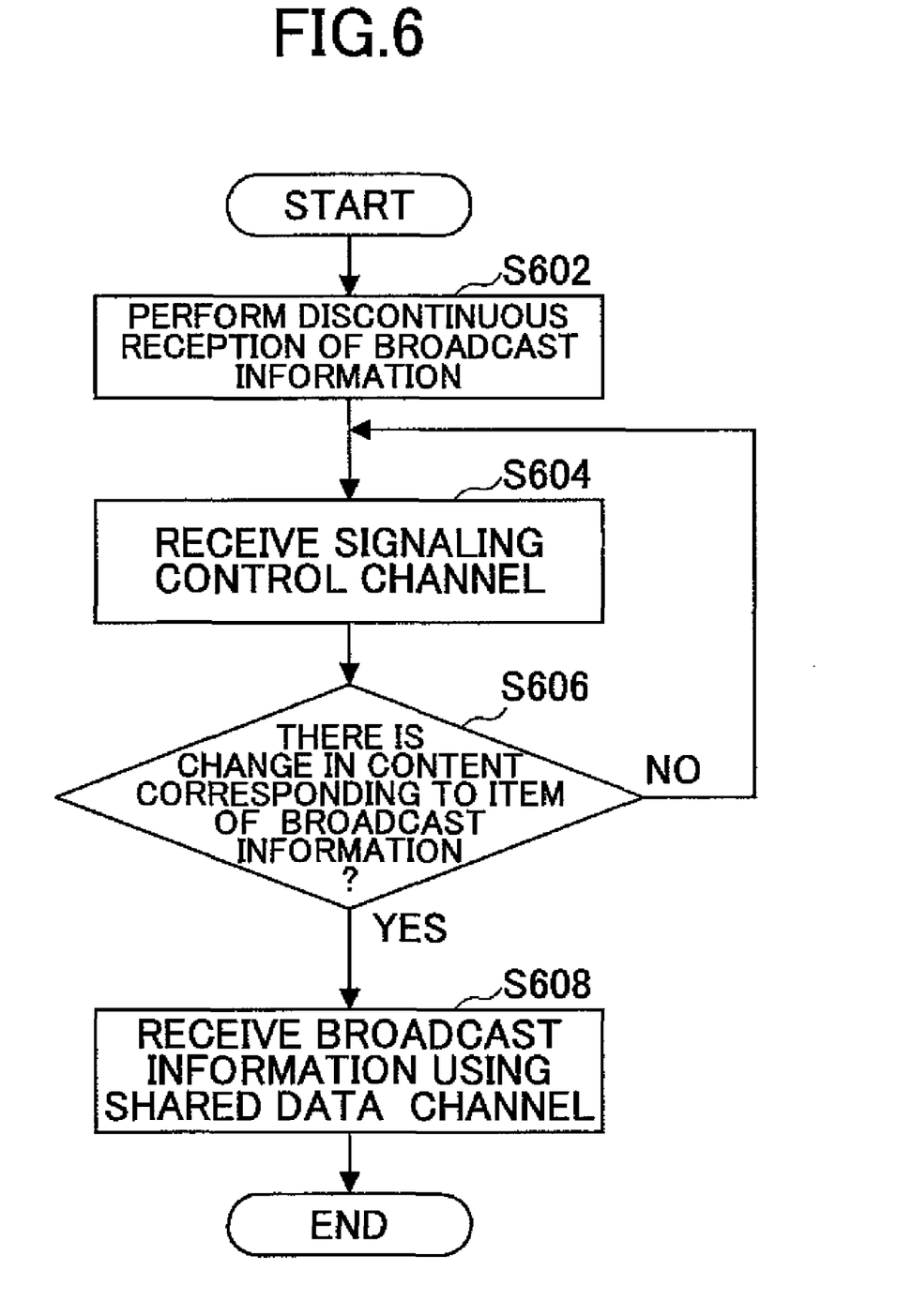
FIG. 6 is a flowchart showing operation of a mobile station according to an embodiment of the present invention.

First, operation of the mobile station 100 is described with reference to FIG. 6.

The transmitting and receiving unit 102 of the mobile station performs discontinuous reception of the broadcast information (step S602). More particularly, the transmitting and receiving unit 102 of the mobile station discontinuously receives a signaling control channel.

Next, the transmitting and receiving unit 102 receives a signaling control channel transmitted from the radio access network apparatus 200 (step S604).

Next, the reception necessity determination unit 104 determines whether to receive a shared data channel based on the received signaling control channel. For example, the reception necessity determination unit 104 determines whether information, indicating presence or absence of change of content corresponding to the item of broadcast information, transmitted by the signaling control channel is information indicating that there is a change (step S606).

When the information indicating presence or absence of change of content corresponding to the item of broadcast information is the information indicating that there is a changed (step S606: YES), the broadcast information is received using the shared data channel (step S608). For example, the shared data channel demodulation unit 106 demodulates the shared data channel that is received at the timing corresponding to the signaling control channel. The shared data channel includes content corresponding to the item of the broadcast information transmitted by the signaling control channel.

On the other hand, when the information indicating presence or absence of change of content corresponding to the item of broadcast information indicates no change (step S606: NO), the process returns to step S604.

Figure 7:
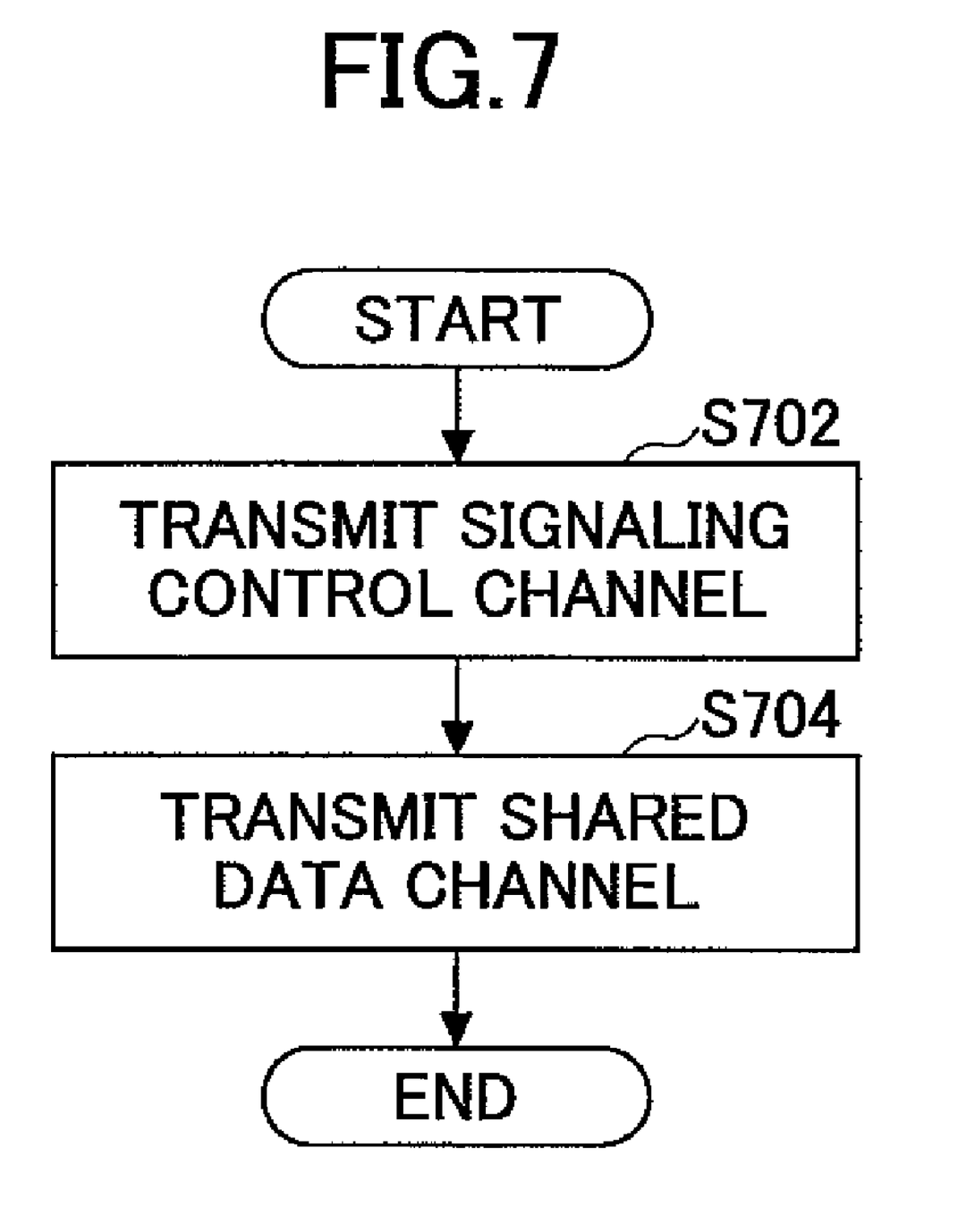
FIG. 7 is a flowchart showing operation of a radio access network apparatus according to an embodiment of the present invention.

Next, operation of the radio access network apparatus 200 is described with reference to FIG. 7.

The signaling control channel control unit 204 assigns a transmission schedule to the transmission timing of the broadcast information to transmit item name of broadcast information to be transmitted using the corresponding shared data channel, and transmit information indicating presence or absence of change of content corresponding to the item of broadcast information (step S702).

Next, the shared data channel control unit 206 assigns a transmission schedule to the broadcast information transmission timing so as to transmit broadcast information corresponding to the item of the broadcast information using the shared data channel corresponding to the signaling control channel (step S704).

According to the present embodiment, since it can be reported whether there is a change of content of broadcast information using the signaling control channel, the mobile station can largely decrease the time during which the receiver should be turned ON for determining presence or absence of change of content of the broadcast information, so that it can contribute to battery saving of the mobile station.

In addition, according to the present embodiment, even though there is a change in content of the broadcast information, since it is only necessary to receive one interleave length of the signaling control channel and the shared data channel that are transmitted at the broadcast information transmission timing, the time required for completing call connection can be decreased.

In addition, when a normal traffic channel is formed by a combination of the signaling control channel and the shared data channel, configurations of the radio access network apparatus and the mobile station can be simplified by using broadcast information having the same configuration (format).

The mobile station, the radio access network apparatus, the mobile communication system and the broadcast information transmitting and receiving method can be applied to mobile communication systems.

The present invention is not limited to the specifically disclosed embodiments, and variations and modifications may be made without departing from the scope of the present invention.

The present application claims priority based on Japanese patent application No. 2005-308925, filed in the JPO on Oct. 24, 2005 and the entire contents of the Japanese patent application is incorporated herein by reference.

The invention claimed is:

1. A mobile station for establishing a signaling control channel and a shared data channel between a radio access network apparatus and the mobile station to perform communication, comprising:
   discontinuous reception means configured to perform discontinuous reception of broadcast information using the signaling control channel;
   shared data channel reception determination means configured to determine whether to receive the shared data channel based on an item of broadcast information and information indicating presence or absence of change of content corresponding to the item of the broadcast information that are transmitted by the signaling control channel; and
   shared data channel reception means configured to receive the shared data channel according to the determination.

2. The mobile station as claimed in claim 1, wherein the shared data channel reception determination means determines presence or absence of change of content corresponding to the item of the broadcast information based on a value of Value tag.

3. The mobile station as claimed in claim 2, further comprising:
broadcast information management means configured to hold an item of broadcast information and content corresponding to the item of the broadcast information.

4. The mobile station as claimed in claim 1, further comprising:
broadcast information management means configured to hold an item of broadcast information and content corresponding to the item of the broadcast information.

5. A radio access network apparatus for establishing a shared data channel and a signaling control channel between the radio access network apparatus and a mobile station to perform communication, comprising:
signaling control channel control means configured to transmit, at a broadcast information transmission timing using the signaling control channel, an item of broadcast information to be transmitted by the shared data channel corresponding to the signaling control channel and information indicating presence or absence of change of content corresponding to the item of the broadcast information; and
shared data channel control means configured to transmit, at a broadcast information transmission timing, the broadcast information corresponding to the transmitted item of the broadcast information using the shared data channel corresponding to the signaling control channel.

6. The radio access network apparatus as claimed in claim 5,
the signaling control channel control means reports, as the item of the broadcast information, at least one of item names of channel setting information, network setting information, restriction related information, mobile station timer related information, uplink interference amount related information, service related information, other system related information, time information, surrounding cell related information, handover related information, measurement related information, default setting information and transmission power related information.

7. The radio access network apparatus as claimed in claim 6, wherein the signaling control channel control means reports a value of Value tag as information indicating presence or absence of change of content corresponding to the item of the broadcast information.

8. The radio access network apparatus as claimed in claim 5, wherein the signaling control channel control means reports a value of Value tag as information indicating presence or absence of change of content corresponding to the item of the broadcast information.

9. A mobile communication system for establishing a shared data channel and a signaling control channel between a mobile station and a radio access network apparatus to perform communication, the mobile station comprising:
discontinuous reception means configured to perform discontinuous reception of broadcast information using the signaling control channel;
shared data channel reception determination means configured to determine whether to receive the shared data channel based on an item of broadcast information and information indicating presence or absence of change of content corresponding to the item of the broadcast information that are transmitted by the signaling control channel; and
shared data channel reception means configured to receive the shared data channel according to the determination,
the radio access control apparatus comprising:
signaling control channel control means configured to transmit, at a broadcast information transmission timing using the signaling control channel, an item of broadcast information to be transmitted by the shared data channel corresponding to the signaling control channel and information indicating presence or absence of change of content corresponding to the item of the broadcast information; and
shared data channel control means configured to transmit, at a broadcast information transmission timing, the broadcast information corresponding to the transmitted item of the broadcast information using the shared data channel corresponding to the signaling control channel.

10. A broadcast information transmitting and receiving method in a mobile communication system for establishing a shared data channel and a signaling control channel between a mobile station and a radio access network apparatus to perform communication, the broadcast information transmitting and receiving method comprising:
a discontinuous reception step in which the mobile station performs discontinuous reception of broadcast information using the signaling control channel;
a signaling control channel transmission step in which the radio access network apparatus reports, using the signaling control channel, an item of broadcast information to be transmitted by the shared data channel corresponding to the signaling control channel and information indicating presence or absence of change of content corresponding to the item of the broadcast information at the broadcast information transmission timing;
a shared data channel reception determination step in which the mobile station determines whether to receive the shared data channel based on the item of the broadcast information and the information indicating presence or absence of change of content corresponding to the item of the broadcast information that are transmitted by the signaling control channel;
a shared data channel transmission step in which the radio access network apparatus transmits broadcast information corresponding to the reported item of the broadcast information at a broadcast information transmission timing using the shared data channel corresponding to the signaling control channel; and
a shared data channel reception step in which the mobile station receives the shared data channel according to the determination.

11. The broadcast information transmitting and receiving method as claimed in claim 10, wherein,
in the signaling control channel transmission step, the radio access network apparatus reports a value of Value tag as information indicating presence or absence of change of content corresponding to the item of broadcast information, and
in the shared data channel reception determination step, the mobile station determines presence or absence of change of content corresponding to the item of broadcast information based on the value of Value tag.

* * * * *